(12) United States Patent
Mozer

(10) Patent No.: US 7,801,729 B2
(45) Date of Patent: Sep. 21, 2010

(54) USING MULTIPLE ATTRIBUTES TO CREATE A VOICE SEARCH PLAYLIST

(75) Inventor: Todd F Mozer, Los Altos Hills, CA (US)

(73) Assignee: Sensory, Inc., Sunnyvale, CA (US)

(*) Notice: Subject to any disclaimer, the term of this patent is extended or adjusted under 35 U.S.C. 154(b) by 850 days.

(21) Appl. No.: 11/717,248

(22) Filed: Mar. 13, 2007

(65) Prior Publication Data

US 2008/0228481 A1    Sep. 18, 2008

(51) Int. Cl.
G10L 11/00   (2006.01)
G10L 15/18   (2006.01)
G06F 17/30   (2006.01)

(52) U.S. Cl. .................. 704/270; 704/257; 707/706
(58) Field of Classification Search .................. None
See application file for complete search history.

(56) References Cited

U.S. PATENT DOCUMENTS

| | | | |
|---|---|---|---|
| 6,907,397 B2 * | 6/2005 | Kryze et al. ................. 704/251 |
| 7,027,987 B1 | 4/2006 | Franz et al. | |
| 7,031,477 B1 | 4/2006 | Mella et al. | |
| 7,143,102 B2 | 11/2006 | Fiennes et al. | |
| 7,171,018 B2 | 1/2007 | Rhoads et al. | |
| 7,424,431 B2 * | 9/2008 | Greene et al. ............... 704/270 |
| 7,499,858 B2 * | 3/2009 | Wolfel ........................ 704/255 |
| 2002/0045960 A1 * | 4/2002 | Phillips et al. ................ 700/94 |
| 2004/0064306 A1 * | 4/2004 | Wolf et al. ................... 704/201 |
| 2004/0128141 A1 * | 7/2004 | Murase et al. ............... 704/275 |
| 2006/0224259 A1 * | 10/2006 | Buil et al. ...................... 700/94 |
| 2007/0208561 A1 * | 9/2007 | Choi et al. ................... 704/231 |

* cited by examiner

*Primary Examiner*—Brian L Albertalli
(74) *Attorney, Agent, or Firm*—Chad R. Walsh; Fountainhead Law Group PC

(57) ABSTRACT

Embodiments of the present invention improve content selection systems and methods using speech recognition. In one embodiment, the present invention includes a speech recognition method comprising storing content on an electronic device, wherein the content is associated with a plurality of content attribute values, adding the content attribute values to a first recognition set of a speech recognizer, receiving a speech input signal in said speech recognizer, generating a plurality of likelihood values in response to the speech input signal, wherein each likelihood value is associated with one content attribute value in the recognition set; and accessing the stored content based on the likelihood values.

24 Claims, 6 Drawing Sheets

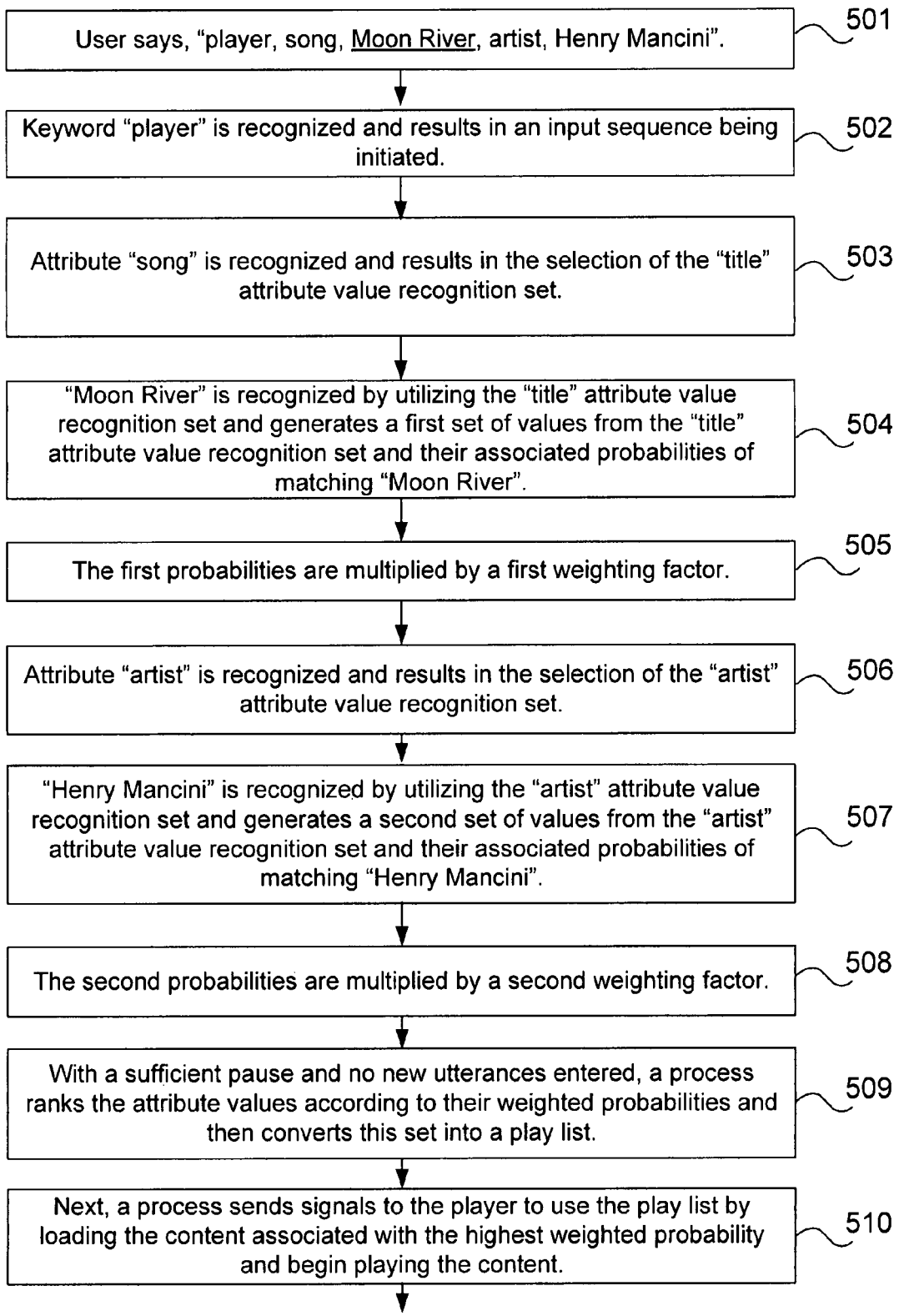
Fig. 5A — Continued on Fig. 5B

USING MULTIPLE ATTRIBUTES TO CREATE A VOICE SEARCH PLAYLIST

BACKGROUND

The present invention relates to content selection, and more particularly, to content selection systems and methods using speech recognition.

Electronic memory and storage technology as well as the internet have increased the amount of content available to people. Hand held devices such as Personal Digital Assistants (PDAs), cellular phones, music players, video players now have memories greater than 1 gigabyte. This large amount of storage capability means thousands of songs, documents, records, audio books, and hundreds of videos can be stored on a single hand held device. Also, with PDAs and cellular phones which can connect to the internet, the amount of content available is staggering. For years people have been using simple menus to search through lists to find the content. Now that there are thousands of selections to sort through and millions of selections if accessing the internet, the task of finding one song, document, or video may take a great deal of time and can be very cumbersome.

The present invention solves these and other problems with improved content selection systems and methods using speech recognition.

SUMMARY

Embodiments of the present invention improve content selection systems and methods using speech recognition. In one embodiment, the present invention includes a speech recognition method comprising storing content on an electronic device, wherein the content is associated with a plurality of content attribute values, adding the content attribute values to a first recognition set of a speech recognizer, receiving a speech input signal in said speech recognizer, generating a plurality of likelihood values in response to the speech input signal, wherein each likelihood value is associated with one content attribute value in the recognition set; and accessing the stored content based on the likelihood values.

In one embodiment, the present invention further comprises ranking the likelihood values, wherein the stored content is accessed based on said ranking.

In one embodiment, the ranking is highest likelihood to the lowest likelihood.

In one embodiment, the present invention further comprises generating a play list based on the likelihood values.

In one embodiment, the content is further associated with attributes, and wherein said attributes are added to a second recognition set, and wherein the first recognition set comprises a plurality of attribute recognition sets each including a plurality of content attribute values associated with a particular attribute, wherein generating the plurality of likelihood values comprises recognizing an attribute from a first spoke utterance in said speech input signal using the second recognition set, selecting one of the attribute recognition sets based on the recognized attribute, and recognizing a content attribute value from a second spoken utterance in said speech input signal using the selected attribute recognition set.

In one embodiment, the present invention further comprises a command recognition set including a plurality of commands, wherein if a spoken utterance in said speech input signal includes one or more commands in the command recognition set, then said commands are executed by the electronic device.

In one embodiment, the content comprises content data and content metadata, and wherein the content metadata comprises said content attribute values.

In one embodiment, the content attribute values comprise a song title or a name of an artist.

In one embodiment, the content is digital music.

In one embodiment, the content is digital video.

In one embodiment, the content is a digital recording.

In one embodiment, the content is stored in a database.

In one embodiment, the electronic device is a portable music player, a portable phone, a portable digital assistant, or a portable video player.

In one embodiment, the present invention includes a speech recognition method comprising storing content on an electronic device, wherein the content is associated with a plurality of content attributes and a plurality of content attribute values, adding at least one content attribute to a content attribute recognition set, adding the plurality of content attribute values to a plurality of content attribute value recognition sets wherein each content attribute value recognition set is associated with at least one content attribute, receiving a speech input signal including multiple spoken utterances, recognizing an utterance from the multiple spoken utterances as a content attribute using the content attribute recognition set, selecting one of the content attribute value recognition sets based on the recognized content attribute, generating a plurality of likelihood values in response to a subsequent utterance from the multiple spoken utterances, wherein each likelihood value is associated with one content attribute value in the selected content attribute value recognition set, and accessing the stored content based on the likelihood values.

In one embodiment, the present invention further comprises ranking the likelihood values, wherein the stored content is accessed based on said ranking.

In one embodiment, the present invention further comprises a command recognition set wherein player commands are added to the command recognition set and used to recognize commands.

In one embodiment, the present invention further comprises multiple recognitions of a plurality of content attributes and a plurality of content attribute values from the multiple spoken utterances and weighting each of the corresponding likelihood values based on the order of the content attributes or attribute values recognized from the multiple spoken utterances.

In one embodiment, the present invention further comprises generating a play list based on the weighted likelihood values.

In one embodiment, the content is stored in a database.

In one embodiment, the electronic device is a portable music player, a portable phone, a portable digital assistant, or a portable video player.

The following detailed description and accompanying drawings provide a better understanding of the nature and advantages of the present invention.

BRIEF DESCRIPTION OF THE DRAWINGS

FIGS. 5A-B is an example of selecting a song using a speech recognition content selection method according to another embodiment of the present invention.

DETAILED DESCRIPTION

Described herein are techniques for a content selection systems and methods using speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
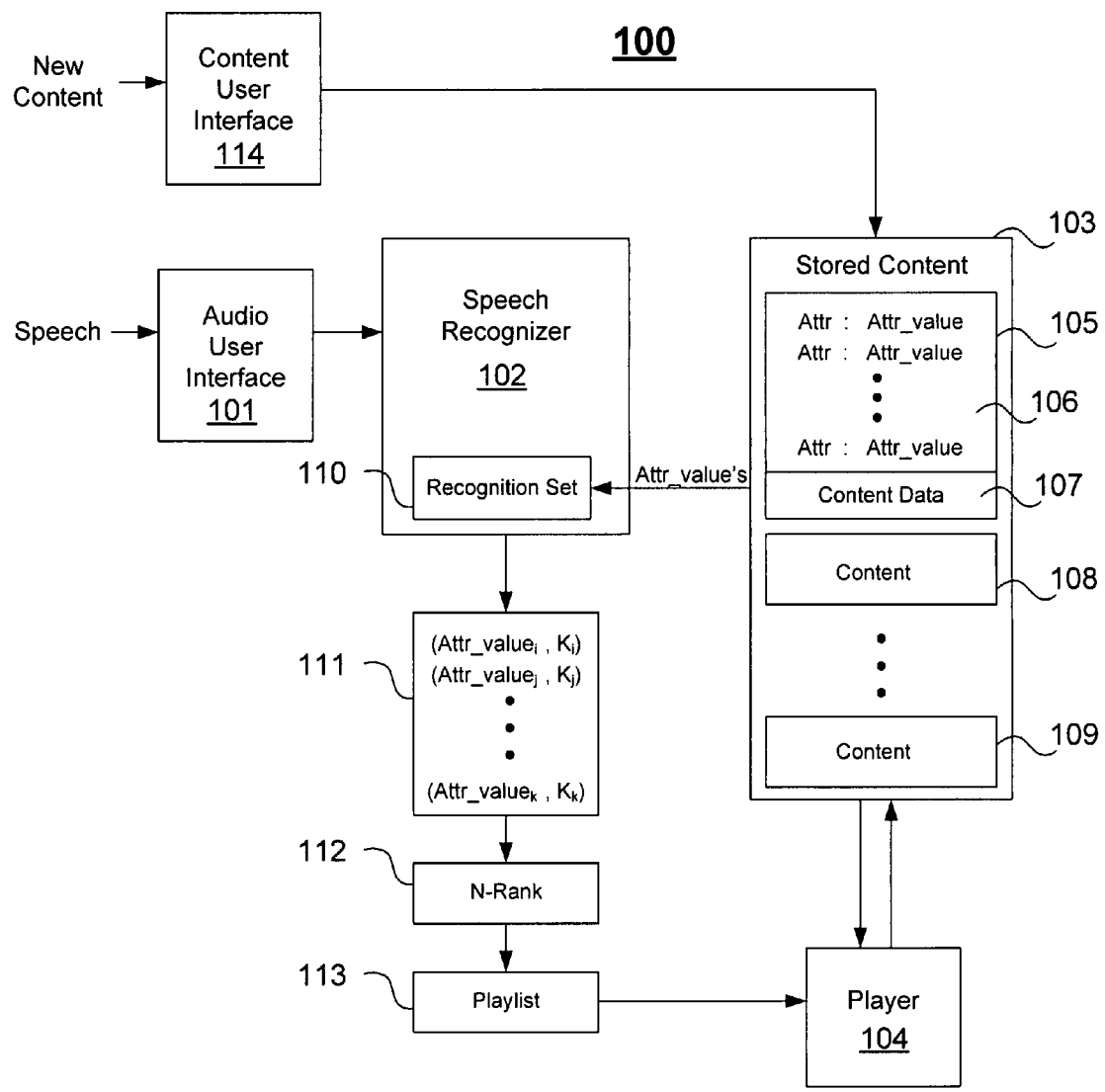
FIG. 1 illustrates a content selection according to one embodiment of the present invention.

FIG. 1 illustrates a content selection according to one embodiment of the present invention. In one embodiment, an electronic device may receive a speech input signal and use a speech recognizer to recognize the input signal and access stored content based on the received signal. A variety of content may be loaded onto an electronic device including, but not limited to, digital music, digital videos, digital recordings (e.g., books on tape), pictures, or any other type of digital entertainment content, for example, a user may want to access. Digital entertainment content is defined herein to mean content comprising audio (sound), images (non-moving images such as pictures or still graphics), or video (moving images such as movies or moving graphics). Embodiments of the present invention may be incorporated into a variety of electronic devices. For example, electronic devices using the present invention may be mobile devices including, but not limited to, a portable music player, a portable phone, a portable digital assistant, or a portable video player.

In one embodiment, an electronic device 100 may receive new content through a content user interface 114. The content user interface 114 may be a wired port such as a Universal Serial Bus port, Ethernet port, Firewire port, or a wireless port such as Bluetooth, Zigbe, 802.11, or infrared, for example. New content may be stored on the electronic device in a variety of formats. For example, a digital music file may be received in the electronic device as an MP3 file and stored in the electronic device's file system. In other embodiments, large amounts of content may be stored in a database. As illustrated in FIG. 1, content 105, 108, and 109 may be stored at 103 in the memory of an electronic device, such as a hard drive or any other volatile or non-volatile memory, for example. The stored content includes content data 107 and content metadata 106 (i.e., information that describes the content data), wherein the content metadata comprises a plurality of content attribute values. Accordingly, stored content is associated with a plurality of content attribute values. For example, attribute values may include the titles of songs or movies, the names of artists or composers, genre information (e.g., rock, classic rock, jazz, pop, or classical for music, drama, horror, comedy, animation for video, or family pictures, mountain scenery, holiday pictures, or clip art for images), dates, or a variety of other information about the content. Each attribute value may correspond to a particular attribute. For example, an attribute may be "song," and the attribute value may be any title of any song stored as content. As another example, an attribute may be "artist," and the attribute value may be any name of any artist stored as content. Each item of content stored on the electronic device may be associated with numerous attributes or attribute values. Example content may be associated with a plurality of attribute values, and the attributes may define what type of attribute values may be associated with the content. Attributes may be determined by analysis of the metadata associated with each item of content, or the attributes may be specified in the metadata.

In one embodiment, the content attribute values for the stored content are added to a recognition set 110 of a speech recognizer 102 and used to process received speech input signals and access the stored content. For example, a spoken utterance (speech) may be received by an audio user interface 101 on the electronic device. The audio user interface 101 may include a microphone, analog processing circuits, and an analog-to-digital converter, for example. The output of the audio user interface 101 is a speech input signal. The speech input signal is received by the speech recognizer 102, and the speech recognizer 102 performs speech recognition using the recognition set 110. Example speech recognition techniques that may be used are disclosed in U.S. Pat. No. 5,790,754, naming Forrest S. Mozer, Michael C. Mozer, Todd F. Mozer as inventors, the complete disclosure of which is hereby fully incorporated herein by reference. Other example speech recognition techniques are disclosed in U.S. patent application Ser. No. 10/866,232, filed Jun. 10, 2004, naming Pieter J. Vermeulen, Robert E. Savoie, Stephen Sutton, Forrest S. Mozer as inventors, the complete disclosure of which is hereby fully incorporated herein by reference. In one embodiment, the speech recognizer 102 may generate a plurality of likelihood values in response to the speech input signal. Each likelihood value may be associated with one of the content attribute values in the recognition set. Accordingly, some or all of the content attribute values in the recognition set may have associated likelihoods. If the spoke utterance includes one of the content attribute values in the recognition set, then such content attribute value may have the highest likelihood. However, if the recognition set includes multiple content values that sound similar (e.g., the song titles "Sing a song" and "Song of Songs"), then the attribute value corresponding to the spoken utterance may not have the highest likelihood. Accordingly, embodiments of the present invention may generate attribute value—likelihood pairings 111 (Attr_value, K). The recognizer may generate likelihoods for all the attribute values in the recognition set, or the recognizer may only generate likelihoods for some, but not all, of the attribute values in the recognition set (e.g., likelihoods less than some predefined threshold may be automatically excluded). The stored content may be accessed based on the likelihood values. For example, the content attribute values having likelihood greater than a threshold value may be used to access the corresponding content. In one embodiment, the attribute values having likelihood greater than a threshold may be used as search terms or in a query to find the corresponding content and send such content to a player 104.

In one embodiment, the likelihoods and attribute values may be ranked and the stored content is accessed based on the ranking. For example, in one embodiment the likelihoods are ranked from the highest likelihood to the lowest likelihood. For instance, a first content attribute value may have an associated likelihood expressed as a first probability, a second content attribute value may have an associated likelihood expressed as a second probability less than the first probability, and a third content attribute value may have an associated likelihood expressed as a third probability less than the first and second probabilities, and so forth, and the content attributes may be correspondingly ordered based on their probability rankings. The ranking 112 may be used to automatically generate a play list for accessing the content based on the likelihood values. For example, likelihood values ranked from highest to lowest may be used to form a play list. The play list may in turn be used to automatically access the content and start providing the content to the user. For example, a number of songs may be accessed automatically and begin playing in response to a user's input utterances.

Figure 2:
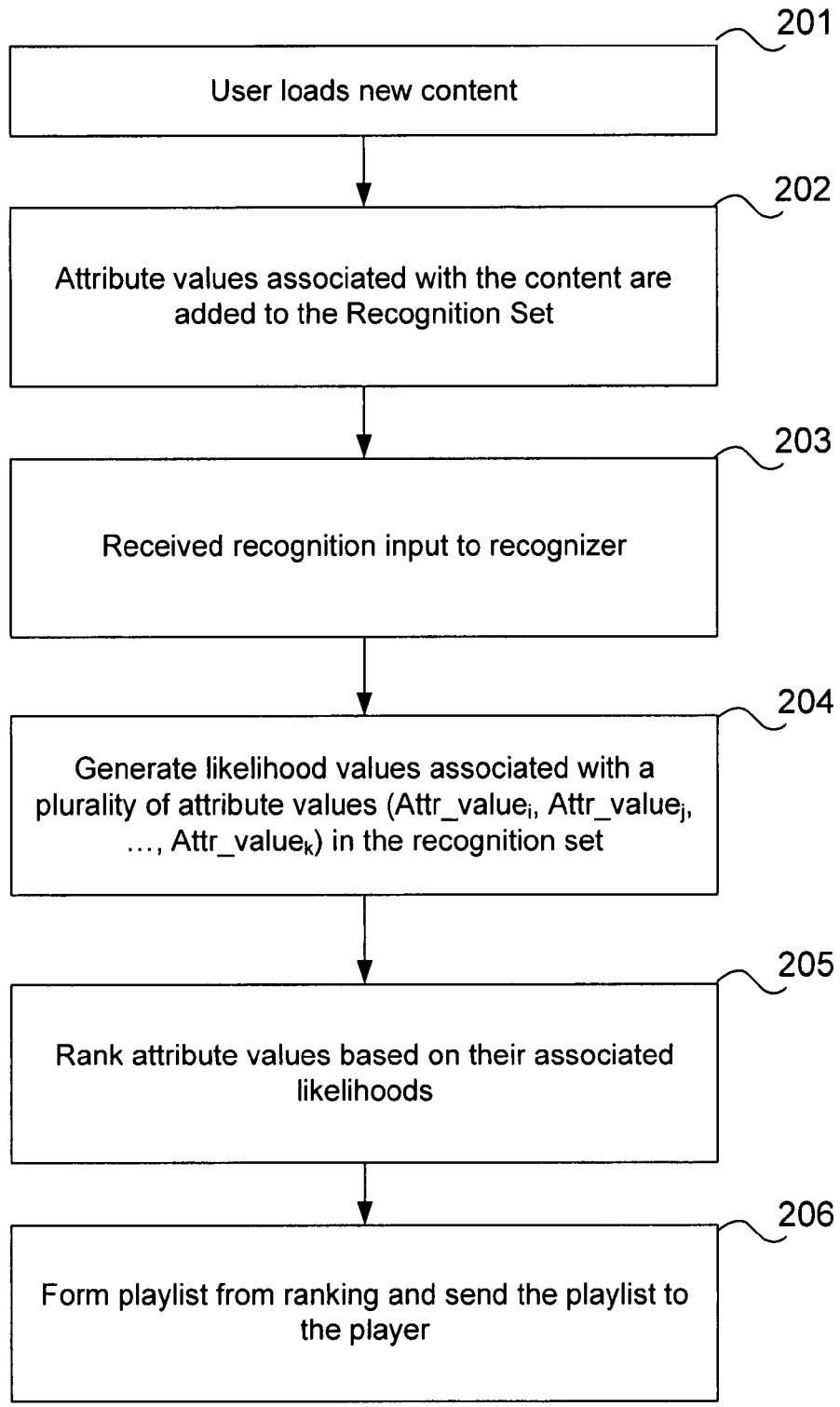
FIG. 2 illustrates a speech recognition method according to one embodiment of the present invention.

FIG. 2 illustrates a speech recognition method according to one embodiment of the present invention. At 201, a user loads new content into an electronic device. For example, a user may connect a USB cable between portable music player and a computer system and download a plurality of digital music. At 202, the attribute values associated with the content are added to the recognition set. For example, MP3 music may be part of the stored content and may each include an ID3 type of metadata. Each ID3 tag may indicate title and artist information, and these attribute values can be added to the recognition set. At 203, a recognition input is received by the recognizer. For example, the recognition input may be a digital signal which has been converted by a microphone, amplifier and Analog to Digital converter in an audio user interface electronic circuit. At 204, likelihood values are generated which are associated with a plurality of attribute values in the recognition set. At 205, the attribute values are ranked by their associated likelihoods. For example, the attribute values may be ranked from the attribute value with the highest likelihood to the attribute with the least likelihood. At 206, a play list is formed from the ranking and sent to the player. For example, the play list may be a list of ten MP3 songs which have been ranked from the most likely to the least likely. Any additional entries below some threshold may be excluded from the top ten of the play list. This play list may be used to select, in order, the corresponding MP3 music data (content) to be played on an MP3 player, computer, PDA, or any appropriate device for playing digital music.

Figure 3:
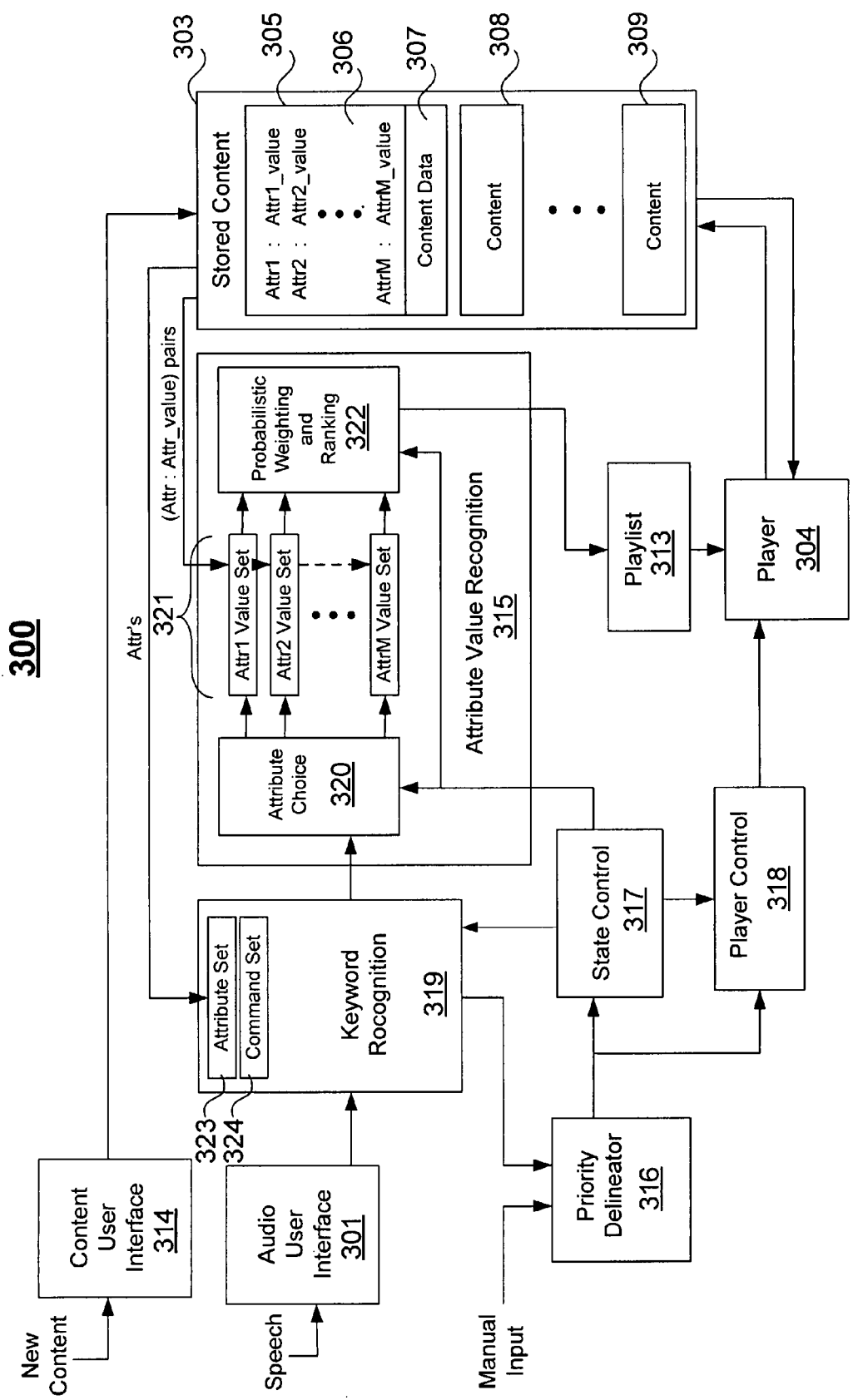
FIG. 3 illustrates a content selection according to another embodiment of the present invention.

FIG. 3 illustrates content selection according to another embodiment of the present invention. In one embodiment, a software program may receive speech input data and use speech recognition algorithms to recognize a stream of voice data and translate that data into a selection of stored content. Recognizers may be implemented in hardware, software, or a combination of hardware and software. A variety of content may be loaded, and a wide variety of electronic devices can be used as mentioned above. In one embodiment of the present invention a portion of the system may be implemented using software executed on a microprocessor or microcontroller. A higher level programming language such as C++ or Java could be implemented on a personal computer or a lower level assembly language may be used to speed up the processing. Additionally, the speech recognition may be implemented in firmware associated with a programmable logic device such as a PGA. Additionally, the speech recognition may be implemented within an ASIC or a combination of electronic blocks which perform the same functions as a PGA within the system.

In one embodiment, an electronic device 300 may receive new content through a user interface 314. A variety of wired and wireless content user interfaces may be used as mentioned above. Mentioned above are some of the ways new content may be stored. The stored content may include content elements (305, 308, 309) with each content element including content data 307 and content metadata 306 (i.e., information that describes the content data), wherein the content metadata comprises a plurality of content attributes and content attribute values. For example, MP3 music players contain MP3 files which may contain ID3 attributes such as "title" and "artist". One MP3 content may have a content attribute value of "Moon River" associated with the "title" content attribute and a content attribute value of "Henry Mancini" associated with the "artist" content attribute. Accordingly stored content is associated with a plurality of attributes and a plurality of attribute values. Some of the many possible attributes associated with a variety of possible content is mentioned above in some detail.

In one embodiment, at least one content attribute is added to a content attribute recognition set 323, a plurality of content attribute values are added to a plurality of content attribute recognition sets 321, and each used to process a received speech input signal and access stored data 303. Each content attribute value recognition set is associated with at least one content attribute. The audio user interface 301 may be as described above. The audio user interface may also include a cell phone and one or more internet communication translators that would present the speech input signal to a recognizer in a separate location. If the user provides multiple utterances in the audio interface, then the output of the audio user interface 301 is a speech input signal including the multiple utterances. The speech input signal is received by a recognizer which may include several recognition processes. The recognizer may include keyword recognition 319 and content attribute value recognition 315. Keyword recognition 319 includes a process in which certain keywords are recognized from one or more recognition sets (323-324) and causes some predefined actions to take place. Keyword recognition may include a command recognition set 324, a content attribute recognition set 323. For example, commands may be added to the command recognition set, and this command recognition set would be used to recognize commands. If one of the utterances of the multiple utterances is "volume up", the keyword would be recognized as a command in the command recognition set and an appropriate signal would be sent to turn up the volume by some predefined amount. A content attribute recognition set includes attributes added from the stored content 303 and is used to recognize an utterance from the multiple spoken utterances as a content attribute.

In this embodiment, one of the content attribute value recognition sets is selected based on the recognized content attribute. From the previous example, the "artist" attribute was recognized via the recognition of the alias "band". In this embodiment, the recognition of the content attribute "artist", generates a signal that inputs to a priority delineator 316 which selects which signal will be propagated to the state control 317. In this case, we will assume the user has not actuated any human interface device that might take priority over the processing of the content attribute recognition. The signal identifying "artist" as the content attribute recognized is processed in the state control 317. The state control keeps track of what utterances are being processed and when to execute commands and instructions. At the appropriate time the state control 317 will send a signal to select the attribute choice 320 in order to use the "artist" attribute value recognition set to perform the attribute value recognition 315. The attribute value recognition process generates a plurality of likelihood values in response to a subsequent utterance from the multiple spoken utterances, wherein each likelihood value is associated with one content attribute value in the selected content attribute value recognition set. For example, if the user were to utter "title, Star Wars", the keyword "title" would be recognized as a content attribute and set up the "title" content attribute value recognition set so that the subsequent utterance "Star Wars" may be processed and result in a plurality of likelihood values associated with each content value. In some embodiments, this process may be generated from a probabilistic weighting and ranking process 322. An example result may look like the following;

{"Start Worrying", 34}
{"Star Wars", 432}
{"Star Wars: Episode Three", 325}.

In this example, the movie "Star Wars" may be selected with the highest likelihood of "432" and the associated video content may be loaded and played on a video player. In another embodiment the likelihood values may be ranked. For example, regarding the movie content "Star Wars", the three likelihood values may be ordered where 432 as the highest likelihood, 325 as the next highest likelihood, and 34 as the least likelihood (as shown below).

{"Star Wars", 432}
{"Star Wars: Episode Three", 325}
{"Start Worrying", 34}

Similar to the previous case, the movie "Star Wars" may be selected from the top of the list and used to load and play the associated video content. In another embodiment, the ranked list may be formed into a play list 313 which may be loaded into a player 304 all at once or one at a time. This play list may be saved for later use. The state control 317 may initiate the player sequence through a player control process 318 which generates signals that direct the player.

Figure 4:
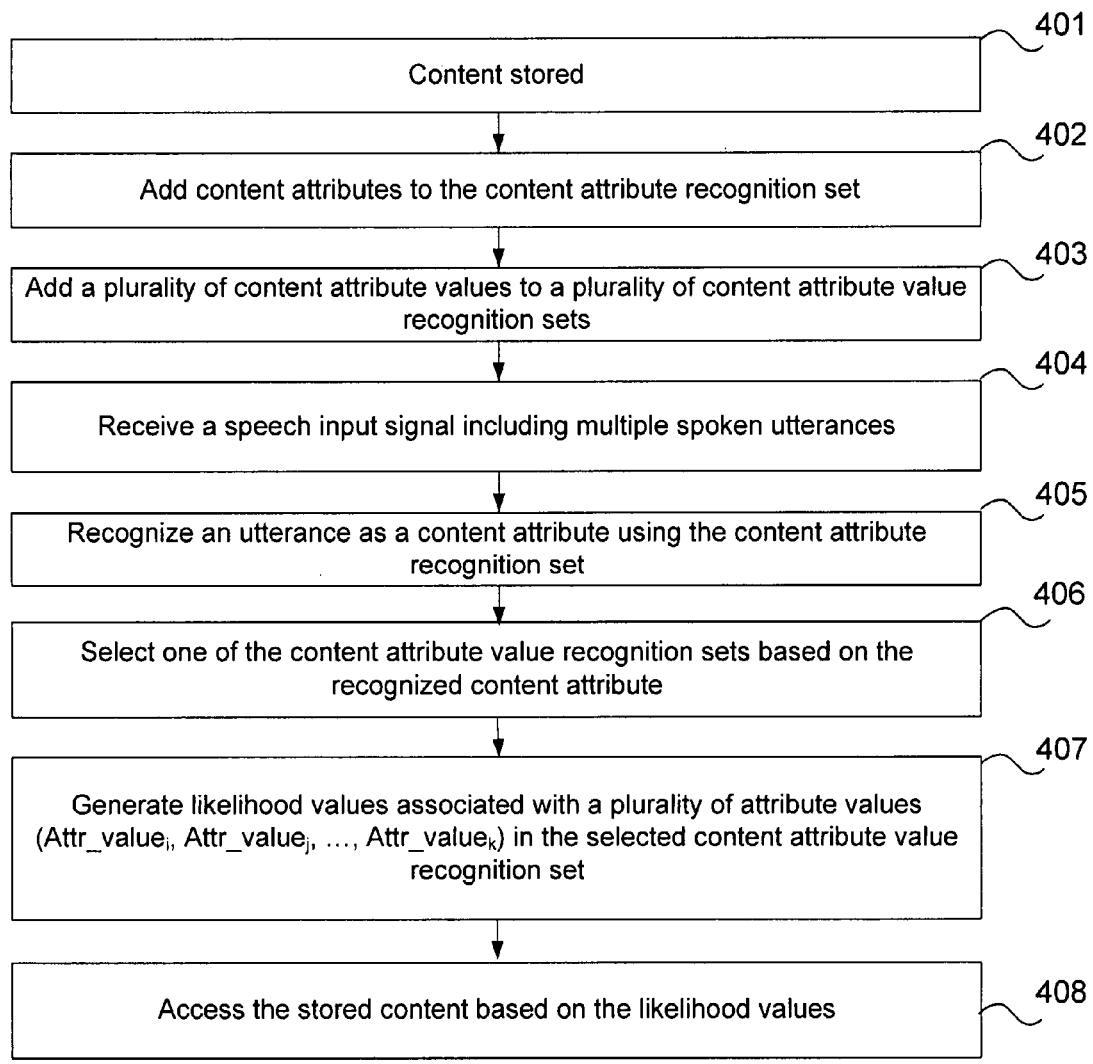
FIG. 4 illustrates a speech recognition method according to another embodiment of the present invention.

FIG. 4 illustrates a speech recognition method according to another embodiment of the present invention. At 401, content is stored. A variety of content that may be used is mentioned above. The storage element need not be integrated into the same device as the recognizer. For example, a flash drive may be used to store the content and be connected to a device which may access the flash drive though a USB interface and perform the subsequent method. Content may be store in any accessible location (e.g. on or off the device). At 402, the content attributes are added to the content attribute recognition set. For example, "title", "author", and "copyright date" may be added to the recognition set from the metadata set of a plurality of library content. At 403, a plurality of content attribute values are added to a plurality of content attribute value recognition sets. For example, content attribute values may include "The Great Gatsby", "F. Scott Fitzgerald", and "1925". These three values would be added to the following content attribute value recognition sets respectively; title content attribute value recognition set, author content attribute value recognition set, and copyright date content attribute value recognition set. The table below illustrates these example content attribute sets and how they may be organized.

| | content attribute recognition sets | |
|---|---|---|
| title set | author set | copyright date set |
| The Great Gatsby | F. Scott Fitzgerald | 1925 |
| This Side of Paradise | F. Scott Fitzgerald | 1919 |
| The Beautiful and the Damned | F. Scott Fitzgerald | 1922 |
| A Leaf Falls | E. E. Cummings | |
| The Old Man and the Sea | Ernest Hemmingway | 1952 |

At 404, a speech input signal including multiple spoken utterances is received. At 405, an utterance from the multiple spoken utterances is recognized as a content attribute using the content attribute set. At 406, one of the content attribute recognition sets is selected based on the recognized content attribute. At 407, likelihood values associated with the plurality of attribute values in the selected content attribute value recognition set are generated. For example, if a user utters "author, Fitzgerald", the utterance, "author", would result in the selection of the author content attribute value recognition set and then the utterance, "Fitzgerald", would result in the generation of likelihood values using the author content attribute value recognition set. The likelihood values may be probability values, for example. At 408, the stored content is accessed based on the likelihoods. Some of the ways in which the likelihoods may be organized has been mentioned above. Accessing the stored content may be simply retrieving the content for viewing or manipulation, for example.

Figure 5B:
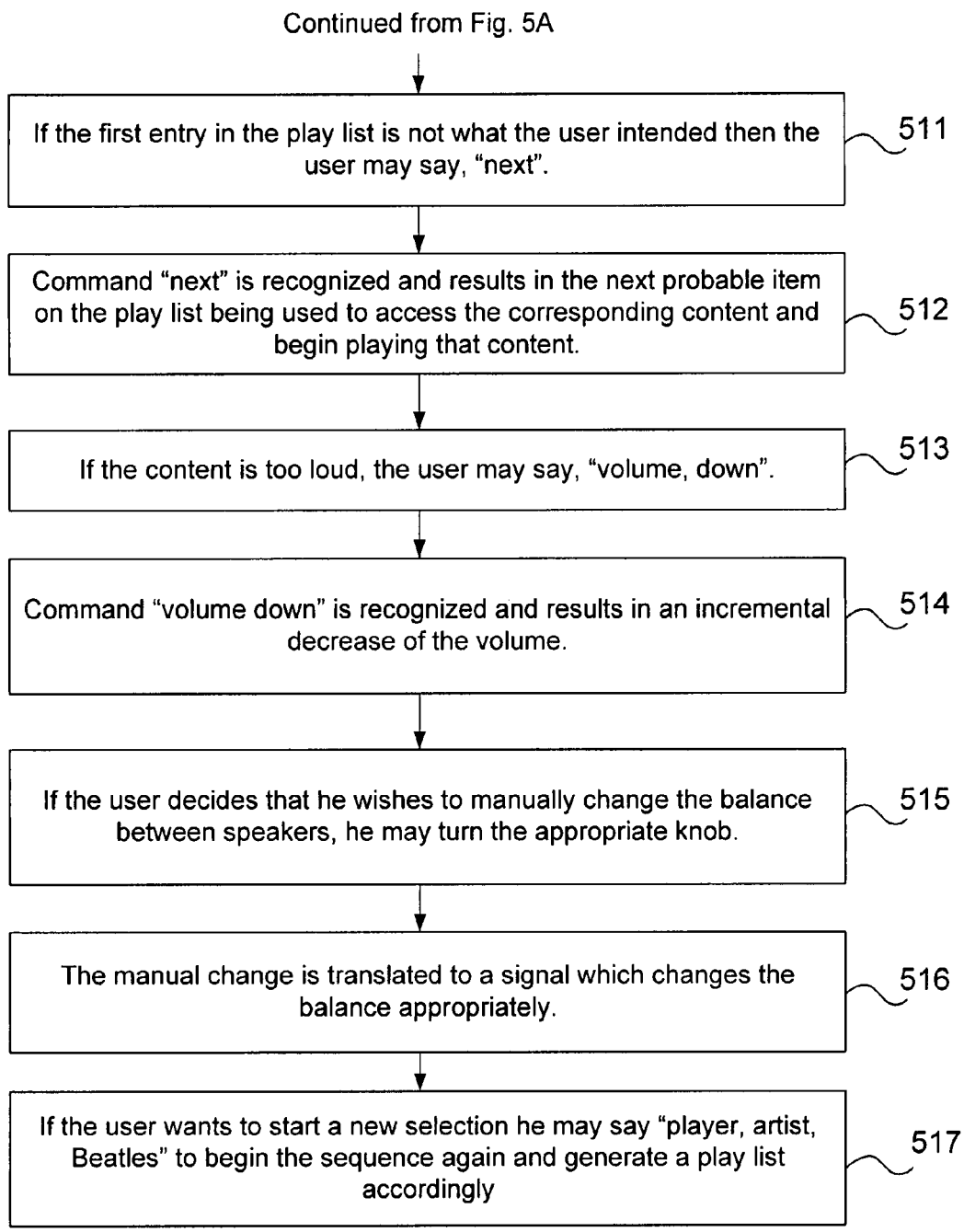

FIGS. 5A-B show an example of selecting a song using a speech recognition content selection method according to another embodiment of the present invention. This example demonstrates multiple recognitions of a plurality of content attributes and content attribute values from the multiple spoken utterances and weighting each of the corresponding likelihood values based on the order of the content attributes and attribute values recognized from the multiple spoken utterances. At 501, the user says, "player, song, Moon River, artist, Henry Mancini". At 502, keyword "player" is recognized and results in an input sequence being initiated. For example, many electronic devices have several modes or features that may be utilized. A cellular phone may have a telephone book, an MP3 player, and an electronic calendar. The keyword "player" results in the MP3 player input sequence being initiated so that all subsequent utterances will be interpreted as associated with the MP3 mode of the cellular phone. At 503, alias "song" is recognized and results in the selection of the "title" attribute value recognition set. At 504, "Moon River" is recognized by utilizing the "title" attribute value recognition set and generating a first set of values from the "title" attribute value recognition set and their associated probabilities of matching "Moon River". At 505, the first probabilities are multiplied by a first weighting factor. At 506, attribute "artist" is recognized and results in the selection of the "artist" attribute value recognition set. At 507, "Henry Mancini" is recognized by utilizing the "artist" attribute value recognition set and generating a second set of values from the "artist" attribute value recognition set and their associated probabilities of matching "Henry Mancini". At 508, the second probabilities are multiplied by a second weighting factor. At 509, with a sufficient pause and no new utterances entered, a process ranks the content attribute values according to their weighted probabilities and then converts this set into a play list. At 510, next a process sends signals to the player to use the play list by loading the content associated to the highest weighted probability and begin playing the content. This may be the first entry on the play list if the content attribute values are ranked from highest probability to lowest probability. At 511, if the first entry in the play list is not what the user intended, then the user may say, "next". At 512, command "next" is recognized and results in the next probable item on the play list being used to access the corresponding content and begin playing that content. At 513, if the content is too loud, the user may say, "volume, down". At 514, command "volume, down" is recognized and results in an incremental decrease of the volume. At 515, if the user decides he wishes to manually change the balance between speakers, he may turn the appropriate knob. At 516, the manual change is translated into a signal which changes the balance appropriately. At 517, if the user wants to start a new sequence he may say "player, artist, Beatles" to begin the sequence again and generate a play list accordingly.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A speech recognition method comprising:
    storing a first plurality of content on an electronic device, wherein each item of content is associated with a second plurality of content attributes, each content attribute having a content attribute value;
    adding the content attribute values for the second plurality of content attributes for the first plurality of content to a first recognition set of a speech recognizer;
    receiving a speech input signal in said speech recognizer;
    generating a plurality of likelihood values in response to the speech input signal, wherein each likelihood value is associated with one content attribute value in the recognition set; and
    accessing the stored content based on the likelihood values and generating a play list based on the likelihood values, wherein, for a third plurality of content attribute values having an associated likelihood value greater than a threshold, content associated with said third plurality of content attribute values is included in the play list.

2. The method of claim 1 further comprising ranking the likelihood values, wherein the stored content is accessed based on said ranking.

3. The method of claim 2 wherein the ranking is highest likelihood to the lowest likelihood.

4. The method of claim 1 wherein said second plurality of the same content attributes are added to a second recognition set, and wherein the first recognition set comprises a plurality of content attribute value recognition sets each including a plurality of content attribute values associated with a particular attribute, wherein generating the plurality of likelihood values comprises:
    recognizing a content attribute from a first utterance in said speech input signal using the second recognition set; and
    selecting one of the content attribute value recognition sets based on the recognized attribute.

5. The method of claim 4 further comprising a command recognition set including a plurality of commands, wherein if a spoken utterance in said speech input signal includes one or more commands in the command recognition set, then said commands are executed by the electronic device.

6. The method of claim 1 wherein the content comprises content data and content metadata, and wherein the content metadata comprises said content attribute values.

7. The method of claim 1 wherein the content attribute values comprise information about an associated item of content.

8. The method of claim 1 wherein the content is digital music.

9. The method of claim 1 wherein the content is digital video.

10. The method of claim 1 wherein the content is a digital recording.

11. The method of claim 1 wherein the content is stored in a database.

12. The method of claim 1 wherein the electronic device is a portable music player, a portable phone, a portable digital assistant, or a portable video player.

13. An electronic device comprising:
    memory, the memory storing a first plurality of content, wherein each item of content is associated with a second plurality of content attributes, each content attribute having a content attribute value;
    a speech recognizer, the speech recognizer including a first recognition set comprising the content attribute values for the second plurality of content attributes for the first plurality of content;
    wherein the speech recognizer receives a speech input signal and generates a plurality of likelihood values in response to the speech input signal, wherein each likelihood value is associated with one content attribute value in the recognition set, and
    wherein the stored content is accessed based on the likelihood values to generate a play list based on the likelihood values, and
    wherein, for a third plurality of content attribute values having an associated likelihood value greater than a threshold, content associated with said third plurality of content attribute values is included in the play list.

14. The electronic device of claim 13 further comprising ranking the likelihood values, wherein the stored content is accessed based on said ranking.

15. The electronic device of claim 14 wherein the ranking is highest likelihood to the lowest likelihood.

16. The electronic device of claim 13 wherein the content comprises content data and content metadata, and wherein the content metadata comprises said content attribute values.

17. The electronic device of claim 13 wherein the content is digital music.

18. The electronic device of claim 13 wherein the content is digital video.

19. The electronic device of claim 13 wherein the content is a digital recording.

20. The electronic device of claim 13 wherein the content is stored in a database.

21. The electronic device of claim 13 wherein the electronic device is a portable music player.

22. The electronic device of claim 13 wherein the electronic device is a portable phone.

23. The electronic device of claim 13 wherein the electronic device is a portable digital assistant.

24. The electronic device of claim 13 wherein the electronic device is a portable video player.

* * * * *